(12) United States Patent
Kobayashi

(10) Patent No.: US 11,819,817 B2
(45) Date of Patent: Nov. 21, 2023

(54) ADSORBENT AND ADSORPTION APPARATUS

(71) Applicant: HOYA Technosurgical Corporation, Tokyo (JP)

(72) Inventor: Shintaro Kobayashi, Tokyo (JP)

(73) Assignee: HOYA TECHNOSURGICAL CORPORATION, Tokyo (JP)

(*) Notice: Subject to any disclaimer, the term of this patent is extended or adjusted under 35 U.S.C. 154(b) by 0 days.

(21) Appl. No.: 18/018,484

(22) PCT Filed: Mar. 11, 2022

(86) PCT No.: PCT/JP2022/010911
§ 371 (c)(1),
(2) Date: Jan. 27, 2023

(65) Prior Publication Data
US 2023/0285931 A1  Sep. 14, 2023

(51) Int. Cl.
*B01J 20/04* (2006.01)
*B01J 20/28* (2006.01)
*B01J 20/282* (2006.01)

(52) U.S. Cl.
CPC ........... *B01J 20/048* (2013.01); *B01J 20/282* (2013.01); *B01J 20/28004* (2013.01); *B01J 20/28019* (2013.01); *B01J 20/28052* (2013.01); *B01J 2220/4806* (2013.01); *B01J 2220/54* (2013.01); *B01J 2220/58* (2013.01)

(58) Field of Classification Search
CPC .... B01J 20/04; B01J 20/048; B01J 20/28019; B01J 20/28052; B01J 20/282; B01J 2220/4806; B01J 2220/54; B01J 2220/58
USPC ....................................................... 502/400
See application file for complete search history.

(56) References Cited

U.S. PATENT DOCUMENTS

| 2009/0254194 A1 | 10/2009 | Peters et al. |
| 2012/0285880 A1 | 11/2012 | Kobayashi |
| 2020/0347239 A1 | 11/2020 | Kitamura et al. |

FOREIGN PATENT DOCUMENTS

| JP | 2004-189868 A | 7/2004 |
| JP | 2010-502318 A | 1/2010 |
| JP | 2011-68539 A | 4/2011 |
| JP | 2018-65715 A | 4/2018 |
| WO | WO 03/104311 A1 | 12/2003 |
| WO | WO 2019/112001 A1 | 6/2019 |
| WO | WO 2021/186750 A1 | 9/2021 |

OTHER PUBLICATIONS

International Search Report for PCT/JP2022/010911 (PCT/ISA/210) dated May 17, 2022.
Written Opinion of the International Searching Authority for PCT/JP2022/010911 (PCT/ISA/237) dated May 17, 2022.

*Primary Examiner* — Edward M Johnson
(74) *Attorney, Agent, or Firm* — Birch, Stewart, Kolasch & Birch, LLP

(57) ABSTRACT

[Problems] To provide a column-use adsorbent having an excellent balance of adsorption capacity and durability, and an adsorption apparatus.
[Means to solve problems] A column-use adsorbent made of powder of a porous particle group of hydroxyapatite or fluoroapatite formed by replacing at least part of a hydroxyl group of hydroxyapatite with fluorine atom, the porous particle group being a group of a plurality of porous particles having different particle sizes, the porous particle group meeting the condition of $D_{Av} \times 45/100 \leq D_{10} \leq D_{Av} \times 75/100$, in which $D_{Av}$ (μm) is an average particle size, and $D_{10}$ (μm) is a particle size at which a cumulative volume of the porous particles from the small size side based on a particle size distribution is 10%.

6 Claims, 1 Drawing Sheet

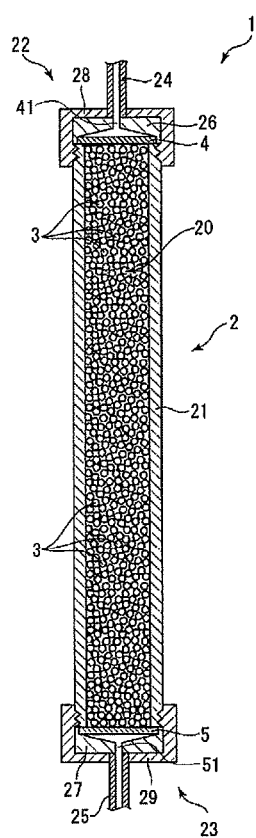

ADSORBENT AND ADSORPTION APPARATUS

FIELD OF THE INVENTION

The present invention relates to a column-use adsorbent and an adsorption apparatus.

BACKGROUND OF THE INVENTION

Hydroxyapatite has high biocompatibility, high safety and the like. For these reasons, in recent years, hydroxyapatite has been widely used, for example, as a material for stationary phase in chromatography, that is, an adsorbent, which is used when biopharmaceutical products, etc. such as antibodies and vaccines are purified and isolated.

As described above, hydroxyapatite (HAP) used as a material for stationary phase in chromatography is produced, for example, as follows.

A first liquid containing calcium hydroxide are reacted with a second liquid containing phosphoric acid while being stirred to obtain hydroxyapatite primary particles, and a slurry containing the primary particles and their aggregates is dried and granulated into hydroxyapatite secondary particles (powder).

The powder is then baked to obtain sintered powder, and the unbaked powder or the sintered powder is filled in a column (adsorption apparatus), etc., as a material for stationary phase (adsorbent) (for example, see Patent Reference 1).

The hydroxyapatite adsorbent described in Patent Reference 1 is, for example, prepared by pulverizing hydroxyapatite primary particles with a wet-type jet mill, granulating them into secondary particles, and then classifying the secondary particles, which thereby has high compressive strength, resulting in high durability. In addition to high durability, however, the powder described in Patent Reference 1 may still have room for improvement in the amount of material that the powder can adsorb, that is, the adsorption capacity of the powder. Namely, the powder described in Patent Reference 1 may further enhance both of durability and adsorption capacity.

On the other hand, it is known that calcium hydroxide used as a raw material of hydroxyapatite is, for example, prepared by reacting quicklime (calcium oxide), which is obtained by baking limestone, with water (for example, see Patent Reference 2). As shown in Patent Reference 2, the physical properties of calcium hydroxide vary according to the metal impurities content, oxalic acid reactivity, etc. of limestone used as a raw material. In addition, the physical properties of the synthesized hydroxyapatite powder vary according to the physical properties of calcium hydroxide used as a raw material, the synthetic reaction conditions of hydroxyapatite, granulation conditions, etc. Therefore, the synthesized hydroxyapatite powder has different physical characteristics due to change of these conditions, resulting in variation in the performance.

PATENT REFERENCE

Patent Reference 1: JP 2011-068539 A
Patent Reference 2: JP 2018-065715 A

OBJECT OF THE INVENTION

An object of the present invention is to provide a column-use adsorbent having an excellent balance of adsorption capacity and durability, and an adsorption apparatus.

SUMMARY OF THE INVENTION

This object is achieved by the present invention described in the following (1) to (4).

[1]

A column-use adsorbent made of powder of a porous particle group of hydroxyapatite or fluoroapatite formed by replacing at least part of a hydroxyl group of hydroxyapatite with fluorine atom, the porous particle group being a group of a plurality of porous particles having different particle sizes, the porous particle group meeting the condition of $D_{Av} \times 45/100 \leq D_{10} \leq D_{Av} \times 75/100$, in which $D_{Av}$ (µm) is an average particle size, and $D_{10}$ (µm) is a particle size at which a cumulative volume of the porous particles from the small size side based on a particle size distribution is 10%.

[2]

A column-use adsorbent made of powder of a porous particle group of hydroxyapatite or fluoroapatite formed by replacing at least part of a hydroxyl group of hydroxyapatite with fluorine atom, the porous particle group being a group of a plurality of porous particles having different particle sizes, the porous particle group meeting the condition of $D_{Av} \times 135/100 \leq D_{90} \leq D_{Av} \times 165/100$, in which $D_{Av}$ (µm) is an average particle size, and $D_{90}$ (µm) is a particle size at which a cumulative volume of the porous particles from the small size side based on a particle size distribution is 90%.

[3]

A column-use adsorbent made of powder of a porous particle group of hydroxyapatite or fluoroapatite formed by replacing at least part of a hydroxyl group of hydroxyapatite with fluorine atom, the porous particle group being a group of a plurality of porous particles having different particle sizes, back pressure of a column being 13 to 24 psi when the adsorbent classified so as to have an average particle size of 40±4 µm is dry-filled into a stainless steel column with an inner diameter φ of 4.0 mm and a length of 100 mm, and a 10 mM sodium phosphate aqueous solution at pH 6.5 is supplied into the column at a flow rate of 1.0 ml/min.

[4]

An adsorption apparatus comprising the column-use adsorbent described in any one of the above [1] to [3].

This provides a column-use adsorbent having an excellent balance of adsorption capacity and durability, and an adsorption apparatus.

Effects of the Invention

The column-use adsorbent of the present invention has an excellent balance of adsorption capacity and durability. The method of producing the adsorbent of the present invention can produce such an adsorbent.

BRIEF DESCRIPTION OF THE DRAWINGS

FIG. 1 is a vertical cross-sectional view showing an example of an adsorption apparatus including the adsorbent of the present invention.

DESCRIPTION OF THE PREFERRED EMBODIMENTS

The adsorbent of the present invention and its production method will be described in detail below on the basis of the preferred embodiments shown in the attached drawing.

First, before describing the adsorbent of the present invention and its production method, an example of an adsorption apparatus (separation apparatus) including the adsorbent of the present invention will be described.

<Adsorption Apparatus>

FIG. 1 is a vertical cross-sectional view showing an example of the adsorption apparatus including the adsorbent of the present invention. It is noted that the upper side in FIG. 1 is referred to as an "inlet side," and the lower side in FIG. 1 is referred to as an "outlet side," hereafter.

Herein, the inlet side means a side through which a liquid such as a sample liquid (liquid including a material to be adsorbed), an eluent (phosphate buffer solution), water, etc. is supplied into the adsorption apparatus in the separation (purification) of the adsorbed material to be isolated such as biopharmaceutical products, that is, proteins, etc. On the other hand, the outlet side means a side opposite to the inlet side, through which the liquid flows out from the adsorption apparatus.

The adsorption apparatus 1 shown in FIG. 1 for separating (purifying) the material to be isolated (material to be adsorbed) such as proteins from the sample liquid has a column 2, a particulate adsorbent (filler) 3, and two filter members 4, 5.

The column 2 has a column body 21, and a lid member 22 (first port) and a lid member 23 (second port) attached to the inlet-side end and the outlet-side end of the column body 21 respectively.

The Column body 21 is configured by, for example, a cylindrical member. Each component (each member) of the column 2, which includes the column body 21, may be formed by, for example, various glass materials, various resin materials, various metal materials, various ceramic materials, etc.

After the filter members 4, 5 are covered on the inlet-side opening and the outlet-side opening of the column body 21 respectively, the lid members 22, 23 are mounted in the inlet-side end and the outlet-side end thereof respectively.

In the column 2 of the above configuration, an adsorbent filling space 20 is defined by the column body 21 and the filter members 4, 5. The column body 21 equipped with the lid members 22, 23 secures liquid tightness in the adsorbent filling space 20. The adsorbent filling space 20 is filled at least partially (fully in this embodiment) with the adsorbent 3.

The inner diameter (column inner diameter) of the adsorbent filling space 20 is appropriately set according to the volume of the sample liquid. The inner diameter is, for example, preferably about 1.0 mm or more and 1000.0 mm or less, and more preferably about 2.0 mm or more and 700.0 mm or less. The length (column length) of the adsorbent filling space 20 is, for example, preferably about 3.0 mm or more and 300.0 mm or less, and more preferably about 4.0 mm or more and 250.0 mm or less. When the column 2 having the adsorbent filling space 20 with such dimensions (inner diameter and length) is used for isolation of the material in the sample liquid, the material to be isolated can be purified with excellent accuracy.

By setting the dimensions of the adsorbent filling space 20 as described above, and setting the particle sizes of the adsorbent 3 as described below, the target material can be selectively isolated (purified) from the sample liquid, that is, the material to be isolated (material to be adsorbed) such as proteins and contaminants, which are other than the material to be isolated, included in the sample liquid can be reliably separated.

The target material to be isolated (purified) using the adsorbent 3 is not limited to proteins such as acidic proteins and basic proteins such as albumins, antibodies (antibody molecules), etc., and includes, for example, negatively charged materials such as an acidic amino acid, DNA, RNA, a negatively charged liposome, etc., and positively charged materials such as a basic amino acid, a positively charged cholesterol, a positively charged liposome, etc. That is, various materials such as biopharmaceutical products such as antibodies and vaccines can be purified/isolated using the adsorbent 3 as the material to be adsorbed.

The column body 21 equipped with the lid members 22, 23 secures liquid tightness therebetween.

The lid member 22 (first port) and the lid member 23 (second port) have a cap 28 and a cap 29, an inlet pipe 24 (first flow path) and an outlet pipe 25 (second flow path), and a lid 26 and a lid 27, respectively.

With the inlet-side end (one end) turned vertically upward and the outlet-side end (the other end) turned vertically downward, the caps 28, 29 are screwed in the inlet-side end and the outlet-side end of the column body 21, respectively, so that the caps 28, 29 and the column body 21 secure liquid tightness therebetween.

The inlet pipe 24 and the outlet pipe 25 are configured by a pipe body through which the liquid flows, and are liquid-tightly fastened (fixed) to almost the centers of the caps 28, 29, respectively. The lids 26, 27 are arranged between the filter members 4, 5 and the caps 28, 29, and have flow paths 41, 51 communicating with the inlet pipe 24 and the outlet pipe 25, respectively. The liquid is supplied to the adsorbent 3 through the inlet pipe 24, the lid 26 and the filter member 4. The sample liquid supplied to the adsorbent 3 passes through spaces (gaps) between particles of the adsorbent 3, and then flows out of the column 2 through the filter member 5, the lid 27 and the outlet pipe 25. At this time, the material to be isolated (material to be adsorbed) and the contaminants other than the material in the sample liquid (sample) are separated on the basis of the difference of adsorptivity to the adsorbent 3 and the difference of affinity to the eluent.

Namely, the separation of the material to be isolated is carried out by setting the adsorption apparatus 1 to the state in which the lid member 22 is positioned vertically above the lid member 23, supplying the liquid into the adsorbent filling space 20 through the inlet pipe 24 so that the material to be isolated is adsorbed on the adsorbent 3 filled in the adsorbent filling space 20, and then separating the material to be isolated.

Each filter member 4, 5 has a function of preventing the adsorbent 3 from flowing out of the adsorbent filling space 20, that is, a function of holding the adsorbent 3 in the adsorbent filling space 20. Each filter member 4, 5 is formed by, for example, a polypropylene mesh filter, a polyethylene particle-sintered filter, a stainless steel mesh filter, and a stainless steel particle-sintered filter.

In the adsorption apparatus 1, the adsorbent 3 is made of sintered powder, which is obtained by sintering an unbaked powder (unsintered powder) including hydroxyapatite primary particles and secondary particles, as powder of a group of fine particles having different particle sizes, and thus has an adsorption capacity with respect to the material to be isolated (material to be adsorbed) in the sample liquid (sample).

Herein, the unbaked powder (unsintered powder) including hydroxyapatite primary particles and secondary particles is called "hydroxyapatite powder (or simply called "unsintered powder"), and the baked hydroxyapatite powder is called "sintered hydroxyapatite powder" (or simply called "sintered powder"). In addition, hydroxyapatite powder obtained by mixing a plurality of hydroxyapatite powder groups having different physical properties is called "mixed hydroxyapatite powder" (or simply called "mixed powder").

The sintered hydroxyapatite powder will be described in detail below.

The sintered hydroxyapatite powder is preferably obtained by sintering the hydroxyapatite powder at temperatures of 300° C. or higher and 900° C. or lower. The hydroxyapatite powder is a group of porous particles with fine pores, which is mainly composed of the secondary particles and further includes the primary particles and multiple-order particles.

The secondary particles of hydroxyapatite ($Ca_{10}(PO_4)_6(OH)_2$), that is, hydroxyapatite powder, are porous bodies mainly composed of hydroxyapatite, which are obtained by drying a slurry containing the primary particles and their aggregates so as to granulate them. Hydroxyapatite has a chemically stable apatite structure. It is intended that an atomic ratio Ca/P of the hydroxyapatite is about 1.64 or more and 1.70 or less. The hydroxyapatite secondary particle may be constituted by a secondary particle of fluoroapatite [$Ca_{10}(PO_4)_6(OH)_{2-2x}F_{2x}$, wherein x is 0<x≤1] formed by replacing at least part of a hydroxyl group on its surface with fluorine atom. Herein, hydroxyapatite ($Ca_{10}(PO_4)_6(OH)_2$) and fluoroapatite [$Ca_{10}(PO_4)_6(OH)_{2-2x}F_{2x}$, wherein x is 0<x≤1] formed by replacing at least part of its hydroxyl group with fluorine atom are collectively called "hydroxyapatite" as described above.

($D_{10}$ Value)

In one embodiment of the present invention, the hydroxyapatite porous particle group preferably meets the condition of $D_{Av} \times 45/100 \leq D_{10} \leq D_{Av} \times 75/100$, in which $D_{Av}$ (μm) is an average particle size, and $D_{10}$ (μm) is a particle size at which a cumulative volume of the porous particles from the small size side based on a particle size distribution is 10%. The hydroxyapatite porous particle group more preferably meets the condition of $D_{Av} \times 55/100 \leq D_{10}$, and more preferably meets the condition of $D_{10} \leq D_{Av} \times 70/100$.

($D_{90}$ Value)

In one embodiment of the present invention, the hydroxyapatite porous particle group preferably meets the condition of $D_{Av} \times 135/100 \leq D_{90} \leq D_{Av} \times 165/100$, in which $D_{Av}$ (μm) is an average particle size, and $D_{90}$ (μm) is a particle size at which a cumulative volume of the porous particles from the small size side based on a particle size distribution is 90%. The hydroxyapatite porous particle group more preferably meets the condition of $D_{Av} \times 145/100 \leq D_{90}$.

In one embodiment of the present invention, the hydroxyapatite powder having the above preferred particle size distribution may be obtained by (a) classifying spray-dried particles and sintering them, (b) sintering spray-dried particles without classifying them, or (c) sintering spray-dried particles without classifying them, classifying spray-dried particles and sintering them, and mixing both.

In one embodiment of the present invention, the hydroxyapatite powder having the above preferred particle size distribution may be obtained by conducting any of the above processes (a) to (c), and measuring the particle size distribution of the resultant powder so as to select the particles having the desired particle size distribution.

(Back Pressure)

In one embodiment of the present invention, the back pressure of the column is preferably 13 to 24 psi when the hydroxyapatite porous particle group is classified so as to have an average particle size of 40±4 μm, and then dry-filled into a stainless steel column with an inner diameter φ of 4.0 mm and a length of 100 mm, and a 10 mM sodium phosphate aqueous solution at pH 6.5 is supplied into the column at a flow rate of 1.0 ml/min. The back pressure is more preferably 15 to 20 psi, and further preferably 15 to 18 psi. It is noted that the dry filling means a method of filling powder in the column by adding the powder into a column in which liquid, etc. is not contained from the upper side of the column, and then lightly tapping it in the vertical direction about 100 times (about for 2 minutes) while rotating the column little by little so as to reduce gaps. The dry filling is carried out while preventing powder from flying out of the column and being broken.

In one embodiment of the present invention, the hydroxyapatite porous particle group having the above preferred range of the back pressure may be obtained by measuring the back pressure of particles and then selecting the particles having the predetermined back pressure.

($D_{10}$ Value, $D_{90}$ Value, Back Pressure)

In one embodiment of the present invention, the hydroxyapatite porous particle group preferably meets both the above preferred $D_{10}$ value and the above preferred $D_{90}$ value. In one embodiment of the present invention, the hydroxyapatite porous particle group more preferably meets the above preferred back pressure value, as well as the above preferred $D_{10}$ value and the above preferred $D_{90}$ value.

(Adsorption Capacity)

In one embodiment of the present invention, the adsorption capacity of the hydroxyapatite porous particle group can be measured in the following method. The column (φ 4.0 mm×length 100 mm) in which the sintered hydroxyapatite powder is dry-filled as the adsorbent is prepared, and a sample liquid is prepared by dissolving bovine serum albumin (material to be adsorbed) in 10 mM sodium phosphate buffer solution (pH6.5) so that the concentration is 1.0 mg/mL. The prepared sample liquid is supplied into the column at a flow rate of 1.0 ml/min, while measuring the absorbance value X (wavelength: 280 nm) of the sample liquid to be supplied into the column and the absorbance value Y (wavelength: 280 nm) of the eluate eluted from the column, until the absorbance value Y (wavelength: 280 nm) reaches 10% of the absorbance value X (wavelength: 280 nm), and then the quantity of the material adsorbed on the sintered hydroxyapatite powder to the amount of the sample liquid supplied up to that time (mg/mL) is calculated.

Furthermore, in the measurement test of the antibody adsorption quantity, the adsorption quantity of the material to be adsorbed is preferably 15 mg/mL or more. The adsorption quantity is more preferably 20 mg/mL or more, further preferably 25 mg/mL or more, and most preferably 28 mg/mL or more.

<Production Method of Hydroxyapatite Powder>

In one embodiment of the present invention, the powder made of hydroxyapatite porous particle group is produced, for example, by the following method.

In one embodiment of the present invention, the production method of the adsorbent comprises a step [P1] of preparing a slurry containing the hydroxyapatite primary particles and their aggregates by reacting a calcium source such as calcium hydroxide with a phosphorus source such as phosphoric acid, a step [P2] of spray-drying the slurry to obtain hydroxyapatite powder, a step [P3] of classifying the hydroxyapatite powder as necessary, a step [P4] of baking the hydroxyapatite powder to obtain sintered hydroxyapatite powder, and a step [P5] of mixing a plurality of sintered hydroxyapatite powder groups having different physical properties to obtain mixed powder.

Each of these steps will be described below using an example in which calcium hydroxide is used as the calcium source and phosphoric acid is used as the phosphorus source.

[P1: Preparation Step of Slurry Containing Hydroxyapatite Aggregates]

In this step, by stirring a calcium hydroxide dispersion (first liquid) containing calcium hydroxide and a phosphoric acid solution (second liquid) containing phosphoric acid, calcium hydroxide are reacted with phosphoric acid to form a slurry containing hydroxyapatite primary particles and their aggregates. That is, a slurry containing hydroxyapatite primary particles and their aggregates is prepared.

Specifically, for example, a slurry containing hydroxyapatite primary particles and their aggregates is obtained by dropping a phosphoric acid solution (second liquid) into a calcium hydroxide dispersion (first liquid) while being stirred in a container (not shown) to form a mixed liquid of the calcium hydroxide dispersion and the phosphoric acid solution, so that calcium hydroxide are reacted with phosphoric acid in the mixed liquid.

This method employs a wet synthesis method using a phosphoric acid solution containing phosphoric acid, which does not need an expensive manufacture equipment and can synthesize hydroxyapatite (compound) more easily and effectively. In addition, this reaction has an advantage in that any by-products do not remain in the resultant secondary particles and sintered powder because the reaction between calcium hydroxide and phosphoric acid generates only water as a by-product. Furthermore, because this reaction is an acid-base reaction, this reaction can be easily controlled by adjusting the pHs of the calcium hydroxide dispersion and the phosphoric acid solution.

The phosphoric acid solution containing phosphoric acid may be a phosphoric acid aqueous solution, in which a small amount of other liquid such as alcohol may be added.

Stirring can effectively promote the reaction between calcium hydroxide and phosphoric acid, that is, can enhance the efficiency of the reaction.

The force of stirring the mixed liquid containing the calcium hydroxide dispersion and the phosphoric acid solution, for example, is preferably about 0.75 W or more and 2.0 W or less, and more preferably about 0.925 W or more and 1.85 W or less, per 1 L of the mixed liquid (slurry).

The content of calcium hydroxide in the calcium hydroxide dispersion is preferably about 5% by mass or more and 15% by mass or less, and more preferably about 10% by mass or more and 12% by mass or less. The content of phosphoric acid in the phosphoric acid solution is preferably about 10% by mass or more and 25% by mass or less, and more preferably about 15% by mass or more and 20% by mass or less. By setting the contents of calcium hydroxide and phosphoric acid in these ranges, the contact chances between calcium hydroxide and phosphoric acid increase when the phosphoric acid solution are dropped into the calcium hydroxide dispersion while being stirred, and thus calcium hydroxide can be effectively reacted with phosphoric acid, thereby reliably synthesizing hydroxyapatite.

The dropping rate of the phosphoric acid solution is preferably about 1 L/hr or more and 40 L/hr or less, and more preferably about 3 L/hr or more and 30 L/hr or less. By mixing (adding) the phosphoric acid solution in the calcium hydroxide dispersion at this dropping rate, calcium hydroxide can be reacted with phosphoric acid under milder conditions.

In this case, the dropping time (adding time) of the phosphoric acid solution is preferably about 5 hours or more and 32 hours or less, and more preferably about 6 hours or more and 30 hours or less. By reacting calcium hydroxide with phosphoric acid for this dropping time, hydroxyapatite can be sufficiently synthesized. It is noted that even if the dropping time is made longer than the above upper limit, further progress of the reaction between calcium hydroxide and phosphoric acid cannot be expected.

When the reaction between calcium hydroxide and phosphoric acid gradually proceeds, fine particles of hydroxyapatite (compound) (hereinafter, simply called "fine particles") are generated in the slurry. The fine particles then aggregate by van der Waals force (intermolecular force) generated between the positively charged portion of one fine particle (primary particle) and the negatively charged portion of the other fine particle, so as to form aggregates of hydroxyapatite (compound) (hereinafter, simply called "aggregates"). As the aggregates are formed, the viscosity of the slurry gradually increases.

Furthermore, as the reaction between calcium hydroxide and phosphoric acid proceeds, a ratio between positive charges and negative charges in the slurry becomes closer to even. At this time, a repulsive force applied to the fine particles decreases in the slurry, thereby accelerating the aggregation of the fine particles, resulting in formation of aggregates with larger particle size.

[P2: Drying Step of Slurry to Obtain Hydroxyapatite Powder]

In this step, the slurry prepared in the step [P1] is dried and granulated into unsintered powder (dried powder) mainly composed of hydroxyapatite secondary particles, that is, hydroxyapatite powder.

The method of drying the slurry is not particularly limited, but is preferably a spray-drying method. According to this method, the aggregates are granulated so that powder with a desired particle size can be obtained more reliably and in a shorter time.

The drying temperature of the slurry is preferably about 75° C. or higher and 250° C. or lower, and more preferably about 95° C. or higher and 220° C. or lower. By setting the drying temperature in this range, secondary particles with a high bulk density and a large specific surface area can be obtained.

The above steps [P1] to [P2] constitute a first step of preparing hydroxyapatite powder.

[P3: Classification Step of Classifying Hydroxyapatite Powder as Necessary]

This step is to classify the dried powder obtained by the steps [P1] to [P2]. In this classification step, for example, the average particle size and particle size distribution of the powder can be controlled by removing particles with smaller particle sizes than a predetermined value and particles with larger particle sizes than a predetermined value. When it is not necessary to control the average particle size and particle size distribution of the powder, the classification step can be omitted.

[P4: Sintering Step of Baking Hydroxyapatite Powder to Obtain Sintered Hydroxyapatite Powder]

This step is to bake the powder obtained by the steps [P1] to [P3]. The baking temperature of the powder may be about 300° C. or higher and 900° C. or lower, and is preferably 350° C. or higher. The baking temperature is preferably 850° C. or lower, and more preferably 800° C. or lower.

The time of holding the baking temperature of the hydroxyapatite powder is not particularly limited, but is preferably about 60 minutes or more and 230 minutes or less, and more preferably about 90 minutes or more and 180 minutes or less.

[P5: Mixing Step of a Plurality of Hydroxyapatite Porous Particle Groups Having Different Physical Properties to Obtain Mixed Powder]

This step is to mix a plurality of sintered hydroxyapatite powder groups having different physical properties obtained by the steps [P1] to [P4]. When the hydroxyapatite porous particle group is provided with desired physical properties without performing the mixing step, the mixing step can be omitted.

According to these steps, the sintered powder constituted by sintered particles mainly composed of hydroxyapatite secondary particles, that is, the sintered hydroxyapatite powder can be obtained.

By filling this sintered hydroxyapatite powder in the adsorbent filling space 20 of the column 2 as the adsorbent 3, the adsorption apparatus 1 can be obtained. In the present invention, although the classification of the hydroxyapatite powder is not essential, when the classification is carried out, the sintered hydroxyapatite powder may have, for example, the average particle size and particle size distribution of 10±4 μm, 20±4 μm, 40±4 μm, 60±4 μm, 80±4 μm, etc.

Although the adsorbent of the present invention and its production method are described above, the present invention is not restricted thereto.

For example, each component of the adsorbent of the present invention may be replaced with whatever exhibits the same function, and the adsorbent of the present invention may be added with arbitrary components. In addition, the method of producing the adsorbent of the present invention may be added with one or more steps for any purpose.

EXAMPLE

The specific examples of the present invention will be described below. The present invention is not restricted to the description of these examples.

1. Production of Hydroxyapatite Powder (Production of Sintered Powder 1)

[P1]

2400 g calcium hydroxide was dispersed in 60 L pure water, and the resultant calcium hydroxide dispersion was supplied in a tank. With the resultant calcium hydroxide dispersion stirred, 4 L phosphoric acid aqueous solution (phosphoric acid concentration: 85% by mass) was dropped therein at a rate of 1 L/hr, obtaining a slurry containing aggregates in which 10% by mass of hydroxyapatite primary particles were aggregated.

The atmosphere temperature during dropping was a room temperature (25° C.). The force of stirring the mixed liquid, in which the phosphoric acid aqueous solution was dropped in the dispersion, was 1.7 W per 1 L of the mixed liquid (slurry).

[P2]

The slurry containing the aggregates was spray-dried at 210° C. using a spray drier ("MAD-6737R" manufactured by MATSUBO Corporation) to granulate hydroxyapatite contained in the slurry, thereby obtaining spherical secondary particles (dried powder).

The powder (secondary particles) was confirmed to be hydroxyapatite by a powder X-ray diffractometry. The next step was carried out without performing a stirring step using a wet-type jet mill.

[P3]

The dried powder obtained in the spray-drying step was classified so as to have a median particle size of about 40 μm by removing particles with smaller particle sizes than the $D_{10}$ value of the unclassified particles, and particles with larger particle sizes than the D75 value of the unclassified particles, by using a cyclone classifier ("TC-15" manufactured by NISSHIN ENGINEERING INC.).

[P4]

The dried powder obtained by the spray drier was baked at 400° C. to obtain sintered powder. This sintered powder was regarded as a "sintered powder 1."

(Production of Sintered Powder 2)

[P1] to [P4]

The dried powder was obtained in the same manner as in the preparation step [P1] and the drying step [P2] of the production of the sintered powder 1. Without performing the classification step [P3], the dried powder was baked at 400° C. to obtain sintered powder [P4]. A stirring step using a wet-type jet mill was not performed also in this production of the sintered powder. The sintered powder obtained in this way was regarded as a "sintered powder 2."

[P5]

The sintered powder 1 and the sintered powder 2 were mixed in mass ratios shown in Table 1 below.

2. Evaluation of Hydroxyapatite Powder 2-1. Measurement of Back Pressure

The resultant mixed powder was dry-filled into a stainless steel column with an inner diameter φ of 4.0 mm and a length of 100 mm, and then a 10 mM sodium phosphate aqueous solution at pH 6.5 was supplied into the column at a flow rate of 1.0 ml/min, while the back pressure of the column was measured. The result is shown in Table 1 below.

2-2. Evaluation of Antibody Adsorption Capacity

Regarding the column containing each mixed powder as the adsorbent, the sample liquid containing the antibody was supplied into the column at a flow rate of 1.0 ml/min, and then the antibody adsorption capacity of the adsorbent was measured in the following means.

That is, first, γ-Globulins from bovine blood (bIgG) was dissolved in 10 mM sodium phosphate (NaP) buffer solution at pH6.5 so that the concentration was 1.0 mg/mL, to prepare the sample liquid (bIgG solution). Next, the stainless steel column (inner diameter φ of 4.0 mm×length of 100 mm) in which each mixed powder is dry-filled as the adsorbent was prepared, and then the prepared sample liquid was sent from a chromatographic pump and supplied into the column at a flow rate of 1.0 ml/min. Then, the absorbance value X (wavelength: 280 nm) of the sample liquid to be supplied into the column and the absorbance value Y (wavelength: 280 nm) of the eluate eluted from the column were measured, the sample liquid was sent until the absorbance value Y (wavelength: 280 nm) reaches 10% of the absorbance value X (wavelength: 280 nm).

2-3. Evaluation of Durability

<A1> The adsorption apparatus in which the mixed powder 1 was filled was mounted on the chromatograph. 400 mM sodium phosphate buffer solution (pH 6.5, temperature: 25° C.) was then supplied into the adsorption apparatus at a flow rate of 1.0 mL/min and a supply amount of 10 CV so as to substitute the inside of the adsorption apparatus with 400 mM sodium phosphate buffer solution.

<A2> Next, 10 mM sodium phosphate buffer solution (pH 6.5, temperature: 25° C.) was supplied into the adsorption apparatus at a flow rate of 1.0 mL/min and a supply amount of 15 CV so as to equilibrate the adsorption apparatus.

<A3> Next, A sodium phosphate buffer solution (pH 6.5, temperature: 25° C.) containing 10 mM sodium phosphate and 1.0 M sodium chloride was supplied into the adsorption apparatus at a flow rate of 1.0 mL/min and a supply amount of 10 CV to assume the separation step of the protein adsorbed on the adsorbent in the adsorption apparatus.

<A4> Next, 400 mM sodium phosphate buffer solution (pH 6.5, temperature: 25° C.) was supplied into the adsorption apparatus at a flow rate of 1.0 mL/min and a supply amount of 10 CV so as to wash the adsorption apparatus.

<A5> Next, 1.0 M sodium hydroxide aqueous solution (temperature: 25° C.) was supplied into the adsorption apparatus at a flow rate of 1.0 mL/min and a supply amount of 10 CV so as to alkali-wash the adsorption apparatus. The same experiments were also conducted with respect to the other mixed powders.

The back pressure (psi), the average particle size (μm), the $D_{10}$ particle size (μm), the $D_{90}$ particle size (μm), the amount of antibody that can be adsorbed by 1 g adsorbent (mg/g), and the durability (number of times) of each mixed powder are shown in Table 1. In addition, the amount of antibody that can be processed on one column was calculated from these data. These results are shown in Table 1.

TABLE 1

| Mixed Powder No. | Powder 1 (classified): Powder 2 (unclassified) | Average Particle Size $D_{Av}$ (μm) | Back Pressure (psi) | $D_{10}$ (μm) | $D_{90}$ (μm) | Adsorption capacity (IgG) (mg/g) | Durability (Number of Times) | Amount of Processed Antibody (mg) |
|---|---|---|---|---|---|---|---|---|
| 1 | 10:0 | 40 | 12 | 31 | 50 | 40 | 30 | 1200 |
| 2 | 10:1 | 38 | 14 | 30 | 52 | 50 | 28 | 1400 |
| 3 | 10:1 | 39 | 14 | 30 | 52 | 50 | 27 | 1350 |
| 4 | 10:1 | 39 | 14 | 30 | 52 | 50 | 28 | 1400 |
| 5 | 10:2 | 36 | 15 | 25 | 57 | 70 | 26 | 1820 |
| 6 | 10:2 | 36 | 16 | 23 | 58 | 72.5 | 26 | 1885 |
| 7 | 10:2 | 37 | 15 | 24 | 59 | 72.5 | 26 | 1885 |
| 8 | 10:10 | 36 | 20 | 19 | 61 | 70 | 22 | 1540 |
| 9 | 10:10 | 36 | 20 | 18 | 81 | 70 | 21 | 1470 |
| 10 | 0:10 | 36 | 25 | 13 | 65 | 75 | 20 | 1500 |

The above experiments reveal that the mixed powder having a proper particle size distribution has the highest processing capacity (that is, adsorption capacity×durability/unit weight of adsorbent). As $D_{10}$ value of the carrier for chromatography approaches the average particle size, the width of the particle size distribution becomes narrower and the particle sizes become closer to uniform, resulting in expectation that the target material to be separated can be eluted at a more uniform timing. However, the carrier for chromatography in which a large amount of process toward the target material to be separated is required preferably has a wide particle size distribution and a high filling density to some extents, which usefully increasing the protein processing amount of the carrier for chromatography per one column. When the particle size distribution is too wide, however, the filling density becomes too high, thereby increasing the back pressure of the column, resulting in decrease in durability of the column. We have found that the above powder has an excellent balance of adsorption capacity and durability as the carrier for chromatography.

DESCRIPTION OF REFERENCE NUMERALS

1: Adsorption apparatus
2: Column
3: Adsorbent
4: Filter member
5: Filter member
20: Adsorbent filling space
21: Column body
22: Lid member
23: Lid member
24: Inlet pipe
25: Outlet pipe
26: Lid
27: Lid
28: Cap
29: Cap
30: Slurry
41: Flow path
51: Flow path

What is claimed is:

1. A column-use adsorbent made of powder of a porous particle group of hydroxyapatite or fluoroapatite formed by replacing at least part of a hydroxyl group of hydroxyapatite with fluorine atom,
    the porous particle group being a group of a plurality of porous particles having different particle sizes,
    the porous particle group meeting the condition of $D_{Av} \times 45/100 \leq D_{10} \leq D_{Av} \times 75/100$, in which $D_{Av}$ (μm) is an average particle size, and $D_{10}$ (μm) is a particle size at which a cumulative volume of the porous particles from the small size side based on a particle size distribution is 10%.

2. A column-use adsorbent made of powder of a porous particle group of hydroxyapatite or fluoroapatite formed by replacing at least part of a hydroxyl group of hydroxyapatite with fluorine atom,
    the porous particle group being a group of a plurality of porous particles having different particle sizes,
    the porous particle group meeting the condition of $D_{Av} \times 135/100 \leq D_{90} \leq D_{Av} \times 165/100$, in which $D_{Av}$ (μm) is an average particle size, and $D_{90}$ (μm) is a particle size at which a cumulative volume of the porous particles from the small size side based on a particle size distribution is 90%.

3. A column-use adsorbent made of powder of a porous particle group of hydroxyapatite or fluoroapatite formed by replacing at least part of a hydroxyl group of hydroxyapatite with fluorine atom,
    the porous particle group being a group of a plurality of porous particles having different particle sizes,
    back pressure of a column being 13 to 24 psi when the adsorbent classified so as to have an average particle size of 40±4 μm is dry-filled into a stainless steel column with an inner diameter φ of 4.0 mm and a length of 100 mm, and a 10 mM sodium phosphate aqueous solution at pH 6.5 is supplied into the column at a flow rate of 1.0 ml/min.

4. An adsorption apparatus comprising the column-use adsorbent according to claim 1.

5. An adsorption apparatus comprising the column-use adsorbent according to claim 2.

6. An adsorption apparatus comprising the column-use adsorbent according to claim 3.

\* \* \* \* \*